United States Patent [19]

Yasuda et al.

[11] 3,968,390
[45] July 6, 1976

[54] SYNCHRONOUS MOTOR

[75] Inventors: Izuru Yasuda; Hironori Okuda; Kunio Miyashita, all of Hitachi, Japan

[73] Assignee: Hitachi, Ltd., Japan

[22] Filed: Mar. 5, 1974

[21] Appl. No.: 448,277

[30] Foreign Application Priority Data
Mar. 19, 1973    Japan.............................. 48-31004

[52] U.S. Cl................................ 310/156; 310/43; 310/162; 264/323; 260/42.17; 428/323
[51] Int. Cl.²...................................... H02K 21/14
[58] Field of Search ........................ 310/162–164, 310/43, 156, 152, 153, 248, 253, 92; 252/63.2; 260/42.17; 161/170; 264/323

[56] References Cited
UNITED STATES PATENTS 3,163,788   12/1964   Powers............................ 310/156 X
3,471,725   10/1969   Moret et al...................... 310/156 X
3,642,976   2/1972    Buckley et al..................... 264/323
3,720,575   3/1973    Cowlard et al. .................... 161/170

FOREIGN PATENTS OR APPLICATIONS 366,942    2/1932    United Kingdom.................. 310/43

Primary Examiner—Donovan F. Duggan
Attorney, Agent, or Firm—Craig & Antonelli

[57]    ABSTRACT

A synchronous motor is provided with a rotor including magnetic poles composed of a permanent magnet fixed around a rotor shaft, a stator facing the outer periphery of the rotor with an air gap formed therebetween, and a guard ring made of a non-magnetic material of low resistivity and fitly disposed around the outer periphery of the permanent magnet to restrain the surface loss caused by the magnetic flux linking with the guard ring, thereby preventing the reduction of the efficiency of the synchronous motor.

9 Claims, 9 Drawing Figures

SYNCHRONOUS MOTOR

BACKGROUND OF THE INVENTION

The present invention relates to a synchronous motor and in particular to a synchronous motor for use, by being energized from a high-frequency electric power supply, to drive an extra-high speed rotary machine such as a grinder, a compressor, and a centrifugal separator or the like, and being one of the so-called permanent magnet type wherein exciting windings are omitted in its rotor and a permanent magnet is employed instead.

For a simple construction in that the magnetic poles of the rotor are constructed by the use of a permanent magnet instead of exciting windings, the synchronous motor of the permanent magnet type finds increasing use.

The rotor provided with the permanent magnet encounters little problem when it is used for the motor operating at a relatively low rotational speed, while when it is used for the motor operating at a high rotational speed it meets a problem that it is very difficult to design the rotor capable of tolerating the centrifugal force applied thereto when the motor is running at a high rotational speed, only depending upon the mechanical strength of the permanent magnet. This also results in the poor reliability of the machine.

SUMMARY OF THE INVENTION

Thus, an object of the present invention is to provide a synchronous motor of the permanent magnet type having a low surface loss even at an extra-high rotational speed.

The present invention is featured in that the guard ring for protecting the permanent magnet is made of the material having a low resistivity of $10^{-6}(\Omega-m)$ or more.

That is, the present invention aims to restrict the occurrence of eddy currents due to the magnetic flux linking with the guard ring by virtue of the resistance of the guard ring.

For better understanding of the features and objects of the present invention, description will be made in detail referring to the accompanying drawings.

DESCRIPTION OF THE PRIOR ART

Figure 1:
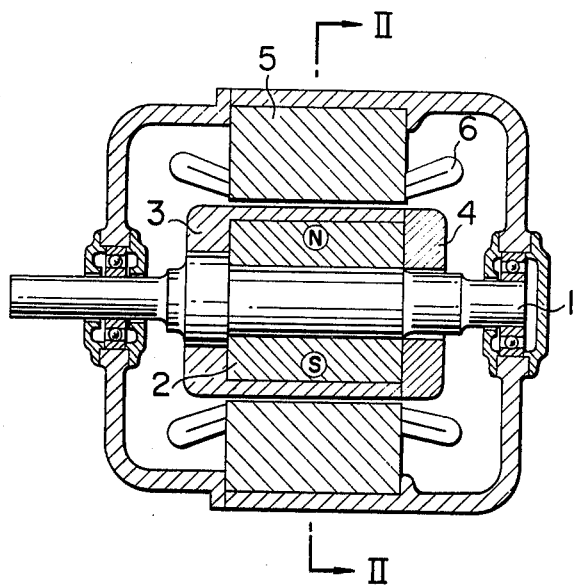
FIG. 1 is a sectional view of the main portion of a conventional synchronous motor of the permanent magnet type.
Figure 2:
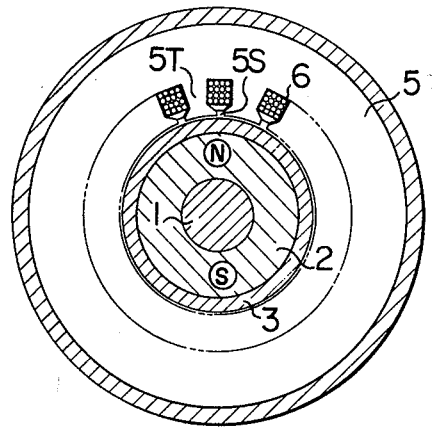
FIG. 2 is a cross sectional view taken along the line II—II of FIG. 1.

Such a rotor having the structure as shown in FIGS. 1 and 2 has been commonly proposed when the rotor of the permanent magnet type is employed in the machine operated at a high rotational speed, wherein a permanent magnet 2 is mounted around a rotor shaft 1, and a guard ring 3 is fitted around the permanent magnet so as to prevent the permanent magnet 2 from being damaged or wrecked by scattering due to the centrifugal force applied thereto. End rings 4 are fitted to the opposite axial end portions of the permanent magnet 2 to prevent the permanent magnet 2 from shifting in the axial direction.

In such construction, since the guard ring 3 and the end rings 4 are arranged across different magnetic poles of the permanent magnet, it is desirable to use a non-magnetic material for those rings 3 and 4 so as not to adversely affect the function of the magnetic pole construction by magnetically short-circuiting these different magnet poles by those rings. Non-magnetic metal materials such as high tension aluminum, austenitic stainless steel, etc. are employed as those non-magnetic materials for the guard rings.

On the other hand, a stator is so arranged that a stator core 5 composed of laminations of silicon steel plates is disposed around the rotor with a gap therebetween, and armature coils 6 are accommodated in slots 5S formed at the inner periphery of the stator core 5.

Figure 3:
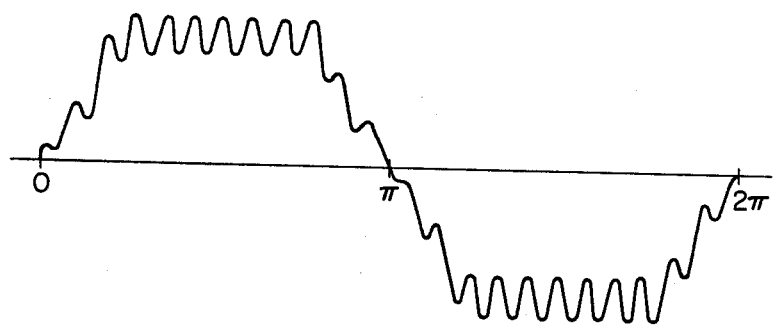
FIG. 3 shows a flux distribution pattern on the surface of the guard ring of the rotor.
Figure 4:
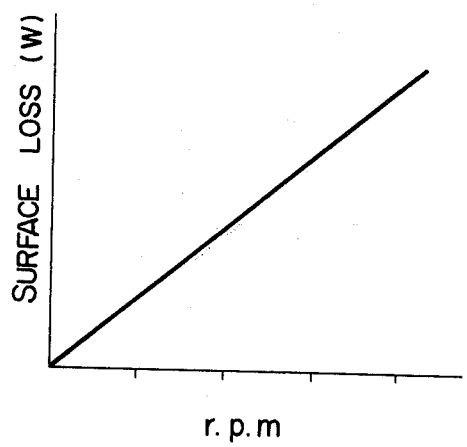
FIG. 4 is a graph showing the relation between the surface loss of the guard ring and the rotational speed of the motor.

The thus constructed synchronous motor is able to hold the permanent magnet 2 sufficiently even at the high rotational speed, resulting in the safer running of the motor. However, there is a difference between the permeability in the slot portion 5S of the stator core 5, and that in the tooth portion 5T formed between the slots. In other words, the air in the slot and the silicon steel plate of the tooth portion are naturally different in the permeability. Due to the difference in the permeability, the magnetic flux interlinking with the surface of the guard ring 3 of non-magnetic metal material is caused to take a form of pulsations, as shown in FIG. 3, pulsating corresponding to the number of the slots 5S of the stator core 5 when the rotor is running opposite to the stator core 5. This pulsating flux induces eddy currents on the surface of the guard ring 3, resulting in a tendency to bring the surface loss of the guard ring. When the synchronous motor rotates at the normal speed (about 3,000 to 3,600 r.p.m.), such surface loss provides no problem because of the small ratio of the surface loss to the total loss of the synchronous motor. On the other hand, when the motor rotates, driven by a high frequency power source, at an extra-high speed (more than about 10,000 r.p.m.), the surface loss increases to abnormally over heat the rotor, and thus to adversely affect the bearing and also to deteriorate the magnetic characteristic of the permanent magnet 2. The relation between the surface loss and the rotational speed of the synchronous motor of the permanent magnet type is shown in FIG. 4. As appreciated from the figure, the surface loss is substantially proportional to the rotational speed, and thus the surface loss is small at a low rotational speed while it is extremely high at a high rotational speed to the extent not to be negligible, resulting in the reduction of the efficiency of the synchronous motor.

DETAILED DESCRIPTION OF THE INVENTION

The present invention will be now described in detail with reference to the embodiment of the present invention shown in the drawings. First of all, the relationship between the resistivity and the surface loss of the guard ring will be discussed in various cases where the synchronous motor provided with the guard ring made of various materials is driven in the range of an extra-high speed about 10,000 r.p.m. or more.

Figure 5:
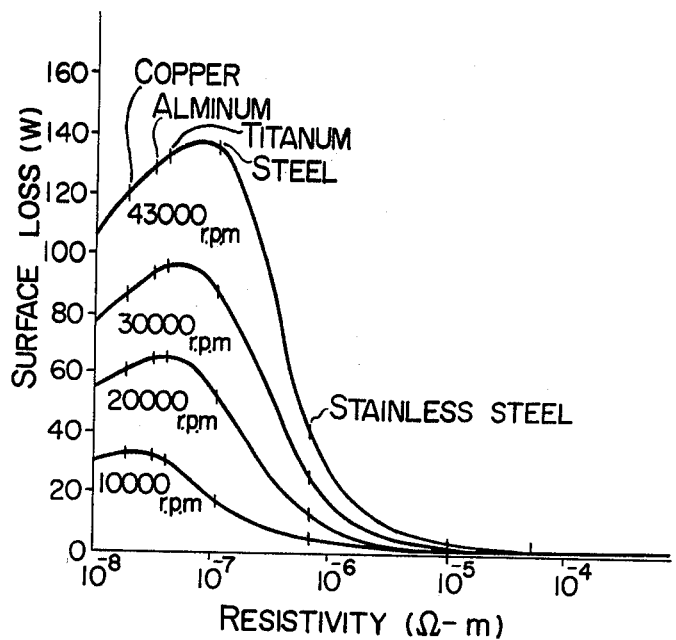
FIG. 5 is a graph showing the relation between the resistivity of the guard ring and the surface loss on the same.

FIG. 5 shows a result of the calculation about the relationship between the resistivity and the surface loss when the synchronous motor of the permanent magnet type of the capacity of 1 KW is operated with a variation of the rotational speed, wherein the guard ring has a diameter of 78 mm and an axial length of 45 mm, the stator core has 24 slots for the windings, and the air gap between the stator and the rotor has the magnetic flux density of 1,700 gauss.

As is seen from the figure, there is a tendency that, in the respective rotational speeds more than 10,000 r.p.m., the surface loss increases temporarily with increase of the low resistivity but it abruptly decreases immediately after its increase, within the range of $10^{-8}$ to $10^{-6}$ ($\Omega - m$). Further, as seen from the figure, the surface loss decreases to be substantially negligible in the range of more than $10^{-5}$ ($\Omega - m$) of the low resistivity. The curves shown in FIG. 5 may be of course changed also by varying the magnetic flux density. However, it becomes clear that, even if the magnetic flux density is changed, the surface loss suddenly decreases at the low resistivity above $10^{-7}(\Omega - m)$, no large surface loss is observed at the low resistivity above $10^{-6}(\Omega - m)$, and the surface loss may be reduced to be negligible regardless of the change of the magnetic flux density at the low resistivity above $10^{-5}$ ($\Omega - m$).

According to the present invention, therefore, in order to hold the permanent magnet disposed around the rotor shaft, there is provided a guard ring made of a non-magnetic material having the resistivity of $10^{-6}(\Omega - m)$ or more by virtue of which no large surface loss is observed.

Carbon fibre reinforced plastic, hereinafter abbreviated as CFRP, containing about 70 per cent fibre, glass fibre reinforced plastic, etc. are given as a material having the low resistivity of $10^{-6}(\Omega - m)$ or more. In those materials, the CFRP is preferable for the guard ring because it has not only low resistivity and is conductive but also is excellent in the mechanical strength, i.e. the tensil strength thereof is about 60 Kg/mm² or more.

It is well known to selectively use the material of low resistivity as the material for the object body (herein the guard ring), wherein eddy currents will be generated, to reduce the generation of the eddy currents to thereby reduce the surface loss due to the variations of the magnetic flux. It should be noted that, however, simply increasing the resistivity does not always reduce the surface loss in the synchronous motor of the permanent magnet type. That is to say, when, for example, the low resistivity is increased from $10^{-8}(\Omega - m)$ to $10^{-7}(\Omega - m)$, there occurs such a phenomenon that the surface loss does not reduce, but inversely increases, as seen from the surface loss curve of FIG. 5, because the penetrating depth of the magnetic flux into the guard ring is also related.

Figure 6:
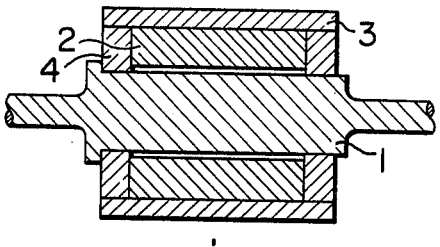
FIG. 6 is a sectional view of the rotor of the synchronous motor of the permanent magnet type according to the present invention.
Figure 7:
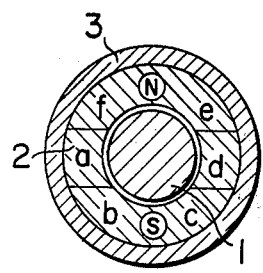
FIG. 7 is a cross sectional view taken along the line VII—VII of FIG. 6.

An embodiment of the present invention will be described referring to FIGS. 6 and 7.

A permanent magnet 2 composed of a plurality of divided pieces of magnetic segments $a$ to $f$ is arranged around a rotor shaft 1, and an end ring 4 made of the material of high tensil strength is mounted at each of the opposite end portions of the permanent magnet 2 to prevent the permanent magnet from shifting in the axial direction. A guard ring 3 formed of CFRP is fitted over the outer peripheries of the permanent magnet 2 and of the end rings 4.

To manufacture the rotor having such construction, the respective end rings 4 are first fitted to the opposite end portions of the guard ring 3. It is desirable, in this case, to cool the respective end rings 4 to fit to the opposite ends of the guard ring 3 by the method of expansion fit so that no gap is formed between each of the end rings 4 and the guard ring 3 due to the centrifugal force applied when the motor is running at a high rotational speed. The permanent magnet 2 is then inserted into the inner space enclosed by the guard ring 3 and the opposite end rings 4 to be fixed on the inner surface of the guard ring 3.

To facilitate the fabrication, at least one of the magnetic segments $a$ to $f$ composing the permanent magnet 2 is shaped to have a pair of parallel surfaces.

The integral assembly consisting of the permanent magnet 2, the guard ring 3, and the end rings 4, is then fitted on the rotor shaft 1. At this time, the permanent magnet 2 is fixedly mounted on the rotor shaft 1 in such a manner that the inner diameter of the permanent magnet 2 is so designed as to be larger than the outer diameter of the rotor shaft 1, and the gap resulting from the diameter difference therebetween is filled with adhesive. Thus, the stress which the permanent magnet exerts to the guard ring 3, due to the centrifugal force during high speed revolution, may be reduced.

Assuming that the outer diameter of the guard ring made of CFRP is 78 mm, the axial length of the same is 45 mm, the stator has 24 slots, the flux density in the gap is 1,700 gauss, and the rotational speed is 43,000 r.p.m., the calculated value of the surface loss at the guard ring is 1 to 2 watts of extremely small value, as seen from FIG. 5, because the low resistivity of the guard ring is $10^{-5}(\Omega - m)$ or more.

On the other hand, if conventional high tension aluminum is used as the material for the guard ring, the low resistivity thereof is nearly about $10^{-8}(\Omega - m)$ and thus the surface loss becomes about 130 W, resulting in that not only the performance of the operation of the synchronous motor is depreciated, but also the heat evolved due to the surface loss adversely affects the lubricant used in the bearing system, and the synchronous motor must be made large in size according to the temperature increment of the rotor.

According to the present invention, the permanent magnet fixed on the rotor shaft is covered with the guard ring made of non-magnetic material, and particularly having the low resistivity of $10^{-6}(\Omega - m)$ or more, so that the suface loss generated on the surface of the guard ring may be restrained to be negligible even when the motor rotates in the range of an extra-high rotational speed, driven by a high frequency electric power supply. Accordingly, adverse effects on every part of the motor based on the heat due to the surface loss may be eliminated and thus the synchronous motor of the permanent magnet type may be provided which is of high performance and of high reliability.

While the present invention has been described in its preferred embodiment, it is to be understood that various modifications may be made without departing from the spirit and scope thereof.

We claim:

1. A synchronous motor comprising a rotor including magnetic pole means composed of permanent magnet means fixedly mounted around a rotor shaft, and a stator facing the outer periphery of said rotor with an air gap therebetween, a guard ring made of a non-magnetic, conductive material having low resistivity of $10^{-6}(\Omega - m)$ or more and fitly disposed on the outer periphery of said permanent magnet means.

2. A synchronous motor according to claim 1, wherein said guard ring is made of carbon fibre reinforced plastic.

3. A synchronous motor comprising a rotor and a stator facing to the outer periphery of said rotor with an air gap therebetween said rotor including magnetic pole means composed of an assembly of a plurality of magnetic segments, an end ring fitly mounted on a rotary shaft of said rotor at each of the opposite ends, in the axial direction, of said magnetic pole means, and a guard ring made of a non-magnetic material having the resistivity of $10^{-9}(\Omega - m)$ or more and fitly mounted over said end rings and said magnetic pole means.

4. A synchronous motor according to claim 3, wherein said guard ring is made of carbon fibre reinforced plastic.

5. A synchronous motor comprising a rotor including magnetic pole means composed of permanent magnet means fixedly mounted around a motor shaft and a stator facing the outer periphery of said rotor with an air gap therebetween, and guard ring means for reducing surface loss of the motor due to flux produced from the stator being disposed on the outer periphery of said permanent magnet means, said permanent magnet means including an assembly of a plurality of magnetic segments, and further comprising an end ring mounted on the rotor shaft of said rotor at each of the opposite ends thereof in the axial direction of said magnet pole means, said guard ring means being mounted over said end rings and said magnetic pole means.

6. A synchronous motor according to claim 5, wherein said guard ring means is a non-magnetic, conductive material.

7. A synchronous motor comprising a rotor including magnetic pole means composed of permanent magnet means fixedly mounted around a motor shaft and a stator facing the outer periphery of said rotor with an air gap therebetween, and guard ring means for reducing surface loss of the motor due to flux produced from the stator being disposed on the outer periphery of said permanent magnet means, said guard ring means being a non-magnetic, conductive material and having a low resistivity of $10^{-6}(\Omega - m)$ or greater.

8. A synchronous motor according to claim 7, wherein said guard ring means is formed of carbon fibre reinforced plastic. 6 —

9. A synchronous motor comprising a rotor including magnetic pole means composed of permanent magnet means fixedly mounted around a motor shaft and a stator facing the outer periphery of said rotor with an air gap therebetween, and guard ring means for reducing surface loss of the motor due to flux produced from the stator being disposed on the outer periphery of said permanent magnet means, said guard ring means serving for reducing surface loss of the motor at rotational speeds of approximately 10,000 r.p.m. or greater, said guard ring means being formed of a non-magnetic, conductive material having a low resistivity of $10^{-6}(\Omega - m)$ or greater.

* * * * *